United States Patent [19]
Melsheimer

[11] 3,789,661
[45] Feb. 5, 1974

[54] AIRCRAFT GLIDE ANGLE AND RATE OF CHANGE OF TOTAL ENERGY INDICATION MEANS

[76] Inventor: Frank M. Melsheimer, 124 Wilson St., Albany, Calif. 94706

[22] Filed: June 25, 1970

[21] Appl. No.: 49,875

[52] U.S. Cl. .................. 73/178 T, 73/179, 73/182, 235/150.2
[51] Int. Cl. ........................................... G01c 21/00
[58] Field of Search ...... 73/179, 178 T, 178 R, 182; 235/150.2, 150.22

[56] References Cited
UNITED STATES PATENTS
3,496,769   2/1970   Vietor.................................. 73/178
3,667,293   6/1972   Moore.............................. 73/398 R Primary Examiner—Donald O. Woodiel
Attorney, Agent, or Firm—White, Haefliger and Bachand

[57] ABSTRACT

Aircraft instrumentation includes means for producing a signal indicative of the time rate of change of the kinetic and potential energy characteristic of the aircraft in flight; and other means responsive to the first means for producing an indication of the glide angle characteristic of the aircraft in flight.

11 Claims, 4 Drawing Figures

PATENTED FEB 5 1974  3,789,661
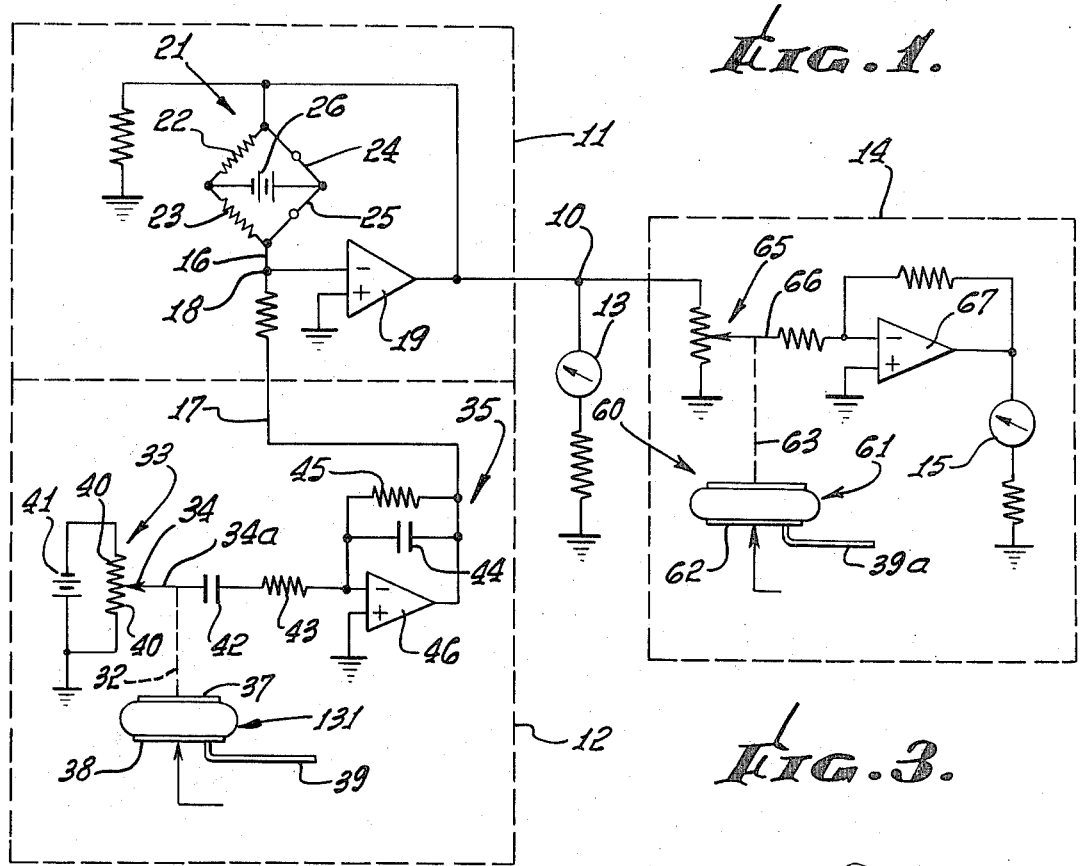
Fig. 1.
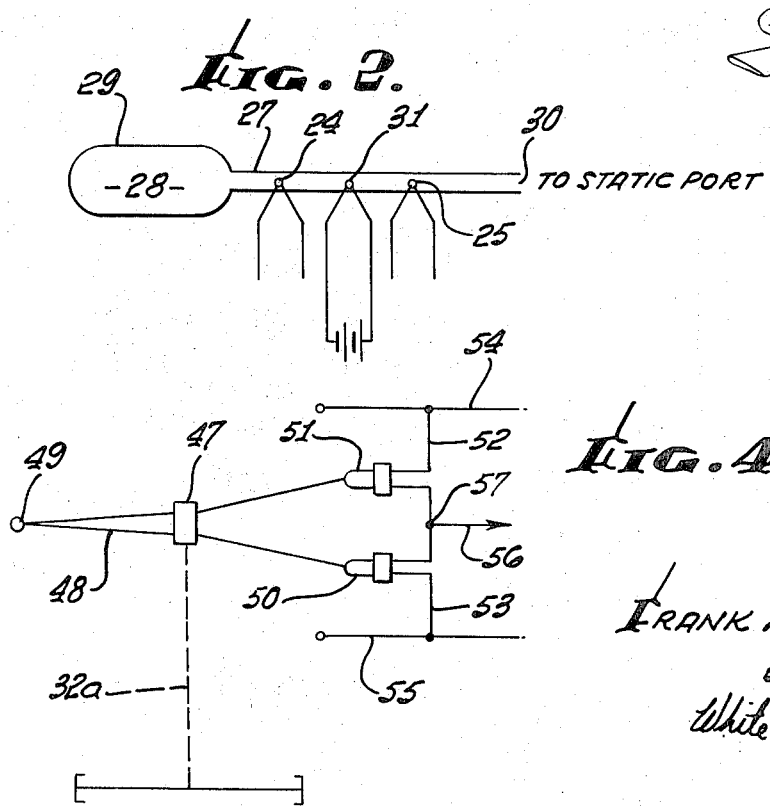
Fig. 2.
Fig. 3.
Fig. 4.
INVENTOR.
FRANK M. MELSHEIMER
By
White, Haefliger & Bachand
ATTORNEYS.

AIRCRAFT GLIDE ANGLE AND RATE OF CHANGE OF TOTAL ENERGY INDICATION MEANS

BACKGROUND OF THE INVENTION

This invention relates generally to instrumentation useful on craft such as aircraft to indicate parameters associated with craft speed and change of altitude. More specifically, the invention concerns instrumentation to indicate a rate of change of total energy and also glide angle.

In the past, the only way to determine the glide angle, that is the ratio of the distance traveled to the altitude lost while gliding, was to measure the airspeed by means of a common airspeed indicator and then divide by the rate of descent, which is measured by a sensitive rate of climb instrument or variometer, or by using an altimeter and stop watch. It can be easily shown that the airspeed divided by the rate of sink or descent is the same as the glide angle defined earlier. This requires the mathematical process of dividing, either by the common longhand method, a slide rule, mentally, or by some other manual method. In any of these processes the division must be done after measuring the two quantities and is not done automatically. Time is consumed and in the case of a slide rule device at least one hand of the pilot or passenger is required to manipulate the device. In the case of only one person aboard and operating the aircraft there may not be sufficient time available for making several of these calculations in the span of a few minutes.

SUMMARY OF THE INVENTION

It is a major object of the invention to provide unusually advantageous apparatus for accomplishing glide angle computation, as by automatically dividing the airspeed by the rate of sink or climb.

It is another object of the invention to eliminate transients from the rate of descent or climb parameter as used in such computation, this being very important to the glider pilot because it allows him to separate the influence of aircraft control inputs which would tend to cause a change in airspeed and the effects of the air mass that the aircraft is operating in. In an aircraft with no excess power applied (either a glider or a power plane with engine power set for a constant airspeed in steady state flight attitude) the airspeed may be changed by diving to increase airspeed or by climbing and decreasing airspeed. Altitude is lost or gained in this process. It can be seen that the pilot slowing down his aircraft by applying the proper control input can simulate a rising air mass, the exact thing that he is trying to measure, locate, and to use in the case of a glider to gain altitude. Thus it becomes apparent that the rate of climb or descent alone is not the best quentity to measure in the interest of the glider pilot. Instead the best quantity is an indication of the time rate of change of the total energy applied to the system, in this case the aircraft. If the energy equation for the system is written:

$$E = 1/2 mV^2 + mgh$$

where $m$ is the mass of the aircraft
$V$ is the true velocity of the aircraft
$g$ is the gravitational constant
$h$ is the altitude of the aircraft
$t$ is time Differentiating gives:

$$dE/dt = mV dV/dt + mg dh/dt$$

It can be seen that $dh/dt$ is the rate of climb or descent and that the true rate of change of energy with respect to time requires the addition of the $V dV/dt$ term. Therefore the addition of this term will give the true influence of the air mass on the system, with full correction for transient conditions. The mass term only acts as a proportionality constant.

The present state of the art "total energy" compensation system corrects the flow of air entering or leaving a source, this flow caused by the change in static pressure due to the change in altitude. The flow, which is measured to indicate the rate of climb or descent, is added to or subtracted from by a diaphram, one side connected to the airspeed pilot total and the other side to the source. With a change in airspeed the diaphram is displaced proportional to the pressure applied and the spring constant of the diaphram, said spring constant is a difficult device to adjust and control.

As will be seen, applicant's system permits direct readout of gliding angle or angle of climb and the correction for transients. This will allow the pilot of the aircraft to ascertain the movement of the air mass in the vertical direction within moments of entering the air mass regardless of airspeed changes during the time interval, and to see the influence that the air mass has on his aircraft.

Accordingly, it is a major object of the invention to provide, in combination with an aircraft, means for producing a signal indicative of the time rate of change of the kinetic and potential energy characteristic of the aircraft in flight; further, it is also an object to provide other means responsive to such signal producing means for producing an indication of the glide angle characteristic of the aircraft in flight.

More specifically, the apparatus of the invention comprises, in combination a. first means to produce a primary signal representing the quantity $$K_1 \cdot V \cdot dV/dt + K_2 \cdot dh/dt$$

where:
$V$ = airspeed of the craft
$dV/dt$ = rate of change of velocity $V$
$dh/dt$ = rate of climb or descent
$K_1$ = a constant
$K_2$ = a constant b. second means to provide an input representing the airspeed $V$, and c. third means to supply an output representing the division of one of the signal and input by the other thereof.

As will be seen, the third means may comprise a transducer to which the signal is applied, the input being applied to a movable element of the transducer; the second means may include a movable diaphragm operatively connected with a movable element of the transducer, the diaphragm being responsive to an air pressure parameter varying with aircraft velocity $V$; and the first means may include a first circuit responsive to an air pressure parameter varying with altitude "$h$" to produce a version of the primary signal component $K_2 \, dh/dt$, and a second circuit responsive to an air pressure parameter varying with velocity $V$ to produce a version of the primary signal quantity $K_1 \, V \, dV/dt$.

Further, the first circuit may advantageously include a contained air pressure source to be carried by the aircraft to communicate with the external atmosphere, and a bridge having temperature sensing elements (as for example thermistors) in the path of air flow between the source and the external atmosphere. Also, the second circuit may include a device to provide a mechanical input version of the quantity $V^2$, a transducer having a movable element to which that input is applied so that the transducer output is a voltage version of the quantity $V^2$, and differentiating means responsive to application of such voltage version to produce the aforesaid version of the primary signal component $K_1 \, V \, dV/dt$.

These and other objects and advantages of the invention, as well as the details of an illustrative embodiment, will be more fully understood from the following description and drawings, in which:

DRAWING DESCRIPTION

FIG. 1 is a circuit diagram representing one preferred form of the invention:

FIG. 2 is a diagram representing a flow measurement device:

FIG. 3 is a showing of an aircraft on which the subject matter of the invention is incorporated; and FIG. 4 illustrates a modified transducer.

DETAILED DESCRIPTION

In FIG. 1, there is produced at point 10 a primary signal representing the time rate of change of the kinetic and potential energy of an aircraft in flight, the latter being shown in FIG. 3. The blocks 11 and 12 in FIG. 1 to the left of point 10 comprise one form of means to produce that signal, and the indicator 13 connected with point 10 is responsive to that signal to indicate the value thereof. The block 14 to the right of point 10 comprises one form of means responsive to the primary signal, (and therefore to the means producing that signal) to in turn produce an indication of the glide angle characteristic of the aircraft in flight. That angle may be indicted by the indicator 13.

The primary signal at 10 represents the quantity $dE/dt$ which is defined by the equation:

$$dE/dt = K_1 \, V \, dV/dt + K_2 \, dh/dt \qquad (1)$$

where, $V$ = airspeed of the craft
$dV/dt$ = rate of change of velocity $V$
$dh/dt$ = rate of change of altitude (climb or descent)
$K_1$ = a constant proportional to mass "$m$" of the craft
$K_2$ = a constant proportional to the product "$mg$" where "$g$" is the gravitational constant In this regard, the block 11 contains what may be referred to as unusually advantageous first circuit means responsive to an air pressure parameter (as for example flow rate) varying with altitude "$h$" above sea level to produce at 16 a version of the primary signal quantity $K_2 \, dh/dt$. Similarly, the block 12 contains what may be referred to as unusally advantageous second circuit means responsive to an air pressure parameter (impact pressure) varying with aircraft velocity $V$ to produce at 17 a version of the primary signal quantity $K_1 \, V \, dV/dt$. These two versions are summed at junction 18 and amplified at 19 to produce the primary signal at 10.

More specifically, the circuitry in block 11 includes a thermistor bridge 21 having resistance legs 22 and 23 and thermistor legs 24 and 25, a battery source 26 being connected as shown. The thermistor may be exposed to airflow through a tube 27 connecting a static pressure source 28 (as for example is defined by a thermally insulated container 29) and a static pressure port 30 carried by the aircraft to be exposed to the exterior pressure. A heating thermistor 31 is also exposed to the tube interior between thermistors 24 and 25. If the aircraft is descending with respect to pressure altitude, the static pressure at port 30 will exceed the pressure in source 28 and air will flow to the left in the tube. There will then be a temperature difference created across the thermistors 24 and 25 which will unbalance the bridge 21 as a function of the air flow rate in the tube, which is a function of rate of change of altitude. While a thermistor variometer has been described, any variometer with an electrical output of sufficient magnitude can be used. Note that amplifier 19 is connected as a summing type operational amplifier.

The circuitry in block 12 includes a device 131 to provide at 32 a mechanical input version of the quantity $V^2$; a voltage divider 33 having a movable element (such as wiper 34) to which the mechanical input is supplied so that the divider output at 34a is a voltage version of the quantity $V^2$; and a differentiating circuit 35 responsive to the divider output to produce the described version of the primary signal quantity $K_1 \, V \, dV/dt$. The device 31 may include a pneumatic diaphragm to one side 37 of which the static pressure at port 30 is applied and to the opposite side 38 of which the pressure developed by a pitot tube 39 is applied. The diaphragm operates a link (as at 32) to displace the wiper 34 of divider, the latter also including a resistance 40 and battery 41. The divider output is coupled to the differentiating circuit via capacitor 42 and resistor 43, and a capacitor 44 and resistor 45 are connected across the amplifier 46 as shown.

An alternative means to produce the signal applied to the differentiating circuit is shown in FIG. 4 to include a shutter 47 movable by diaphragm link 32a in the path of a light beam 48 from a source 49. The shutter 47, initially blocks the light transmission from one photodiode 50, and with increasing airspeed the shutter is moved to decreasingly block light transmission to diode 50 and increasingly block light transmission to another photodiode 51. The two diodes are connected in series at 52 and 53 across the applied voltage between lines 54 and 55. Output is taken at 56 from the center connection 57.

Divider 33 may be considered as one form of a differential pressure transducer producing a voltage proportional to the differential between the impact pressure developed by the pitot tube 39 and the static port pressure.

Referring to block 14 in FIG. 1, it contains means, generally designated at 60, to provide an input representing the airspeed $V$. Such means may comprise a diaphragm unit 61 to the side 62 of which the pressure developed by a pitot tube 39a is applied, that pressure being proportional to $V^2$. The unit 61 is designed to have a non-linear response so that the mechanical output at 63 is proportional to $V$ instead of $V^2$, suitable linkage structure being usable for this purpose.

Block 14 also contains what may be referred to as means responsive to the signal at 10 and to the mechanical input at 63 (representing $V$) to supply an output representing the division of the signal by the $V$ input, (or vice versa, if desired). Since the signal at 10 contains the rate of change of altitude term $dh/dt$, that output will represent an inverted version of the glide ratio, assuming that the term $V\, dV/dt$ contained in the signal is zero or very small due to unchanging velocity of the craft. In this regard, a potentimeter 65 may be connected as shown to accomplish the division by the airspeed quantity $V$. This procedure avoids the problem of dividing $V$ by the $dh/dt$ quantity which could be zero to produce an infinite output at 66. After amplification at 67, the output is indicated at 15 with proper calibration to read directly in desired units (as for example glide angle).

For example, if a glider is being flown in air which is neither rising nor descending and if the airspeed is constant, the $dE/dt$ meter 13 will indicate the rate of sink of the glider. This rate of descent will be applied to the glide angle divider section 14, and will be divided by the airspeed. The glide angle is then indicated by meter 15. If then the glider is flown into an air mass which is rising at the glider's previous rate of descent, the rate of descent will go to zero, while the corresponding glide angle will go to infinity. If then the airspeed is changed, an output from the differentiating section 12 will be applied to the indicators to correct for the aircraft change in speed which must have been caused by diving or pulling up into a climb with its corresponding change in altitude caused by this maneuver. Thus, even if the pilot inadvertently changes his airspeed, the indicators will still show what the air mass is doing to the aircraft.

I claim:

1. In apparatus for producing a signal indicative of the time rate of change of the kinetic and potential energy characteristic of the aircraft in flight, the combination comprising a first circuit means responsive to an air pressure parameter varying with altitude h for producing a first signal indicative of the quantity $K_2\, dh/dt$, where $K_2$ is a constant and $dh/dt$ is the rate of climb or descent of the aircraft, second circuit means responsive to an air pressure parameter varying with the airspeed of the aircraft for producing a second signal indicative of the quantity $k_1 V\, dv/dt$, where $k_1$ is a constant and $dv/dt$ is the rate of change of airspeed $V$, and third circuit means connected to the first and second circuit means to sum the first and second signals for producing a third signal representative of the time rate of change of Kinetic energy and potential energy $de/dt$ defined by the equation $de/dt = K_1 V\, dv/dt + K_2\, dh/dt$.

2. In apparatus to produce an indication of glide angle of an aircraft in flight, the combination comprising a. first means to produce a primary signal representing the quantity $K_1 V\, dV/dt + K_2\, dh/dt$ wherein said first means includes first circuit means responsive to an air pressure parameter varying with altitude h to produce a version of said primary signal quantity $k_2\, dh/dt$, and second circuit means responsive to an air pressure parameter varying with $V$ to produce a version of said primary signal quantity $K_1 V\, dv/dt$, where $V$ = airspeed of the craft $dV/dt$ = rate of change of velocity $V$ $dh/dt$ = rate of climb or descent $K_1$ = a constant $K_2$ = a constant b. second means to provide an input representing the airspeed V, and c. third means to supply an output representing the division of one of the signal and input by the other thereof and indicative of glide angle of the craft.

3. The combination of claim 2 wherein said third means comprises a transducer to which the signal is applied, said input being applied to a movable element of the transducer.

4. The combination of claim 3 including fourth means responsive to the output of said third means to visually indicate said glide angle of the craft.

5. The combination of claim 3 wherein said second means includes a movable diaphragm operatively connected with a movable element of said transducer, the diaphragm being responsive to said air pressure parameter varying with V.

6. The combination of claim 2 wherein said first means includes an amplifier connected with said first and second circuit means to sum said versions.

7. The combination of claim 2 wherein said first circuit means includes a contained air pressure source adapted to be carried by the craft to communicate with the external atmosphere, and a bridge having temperature sensing elements in the path of air flowing between said source and the external atmosphere.

8. The combination of claim 2 wherein said second circuit means includes a device to provide a mechanical input version of the quantity $V^2$, a transducer having a movable element to which said input is applied so that the transducer output is a voltage version of the quantity $V^2$, and differentiating means responsive thereto to produce said version of said primary signal component $K_1 V\, dV/dt$.

9. The combination of claim 2 including indicating means responsive to said primary signal to indicate the value thereof.

10. The combination of claim 8 wherein said transducer comprises a voltage divider.

11. The combination of claim 8 wherein said transducer comprises a photodiode, light source and shutter system wherein shutter movement modulates light reception by the photodiode.

* * * * *